Sept. 5, 1961  B. D. DOBBINS ET AL  2,998,943
ANTENNA CAP
Filed Aug. 12, 1954

BILLY D. DOBBINS
ANGUS C. TREGIDGA
GEORGE W. LUKE, JR.
INVENTORS

BY
ATTORNEYS

United States Patent Office 2,998,943
Patented Sept. 5, 1961

2,998,943
ANTENNA CAP
Billy D. Dobbins and Angus C. Tregidga, Silver Spring, and George W. Luke, Jr., Rockville, Md., assignors to the United States of America as represented by the Secretary of the Navy
Filed Aug. 12, 1954, Ser. No. 449,530
6 Claims. (Cl. 244—14)

The present invention relates to a microwave attenuator. More specifically, it relates to a destructible cap for sealing off a lens-type microwave antenna, thereby preventing premature introduction of energy into the antenna.

One method of steering an aerial missile involves the projection into space of a beam of electro-magnetic energy, together with means mounted on the missile causing the missile to align itself with the axis of the projected beam. The missile can then be steered along a desired course by manipulating the direction in which the beam is projected. A missile which employs this system of guidance is known as a beam-rider.

The accuracy with which a beam-rider can be steered depends to a large extent upon the width of the beam the missile is attempting to follow. Satisfactory results can generally only be obtained by using a beam such as is propagated by a radio transmitter, where the wavelengths of the radio waves are short, thus permitting the construction of directive antennae of reasonable size. A complication is thereby introduced since, ordinarily, the more common types of vacuum tube amplifiers are ineffective to amplify at the very high frequencies corresponding to reasonably short wavelengths. Present practice therefore involves the conversion of the microwave signals received by the missile to signals of a lower frequency which can be amplified. Conversion is accomplished by beating the incoming signal against the signal supplied by a local oscillator in the presence of a crystal diode whose nonlinear characteristics supply the means for efficiently generating the desired lower frequency.

The use of a crystal diode complicates the initial portion of the flight of a missile in that the crystal may very likely be exposed to signal levels of such high power that it will burn out. To prevent such burnouts, prior to the present invention, a closed shutter type attenuator was placed within the waveguide between the antenna and the crystal. The shutter was caused to open at a time when the missile had progressed far enough along its trajectory that objectionable power levels no longer existed.

Disadvantages of the shutter means of preventing crystal diode mixers from burning out are that the mechanism is complicated and costly. The shutter when closed must be so arranged as adequately to attenuate incident energy initially and, upon opening, must retract or fold away in such a manner as to offer minimum attenuation, since at extreme ranges between the missile and the radar transmitter, the power of the signal received by the missile is very low.

It is an object of the present invention, therefore, to provide a simple crystal protective device which will attenuate signals impinging on a missile antenna immediately following the launching of said missile and during the period it is in a strong signal field, but which will not attenuate signals when the power of such signals is not of sufficient magnitude to damage the crystal.

It is another object of the present invention to provide an attenuator which will positively operate without reliance upon timing mechanism, mechanical linkages or the like.

It is still another object of the present invention to provide an attenuator that may be easily and economically produced.

Other objects and many of the attendant advantages of this invention will be readily appreciated as the same becomes better understood by reference to the following detailed description when considered in connection with the accompanying drawings, wherein.

Briefly, the attenuator constituting the present invention comprises an antenna cap formed by coating a lens-type antenna with a metal having a low melting point, so that frictional heat generated by the high speed of the missile's passage through the surrounding air causes the cap to melt away.

Figure 1:
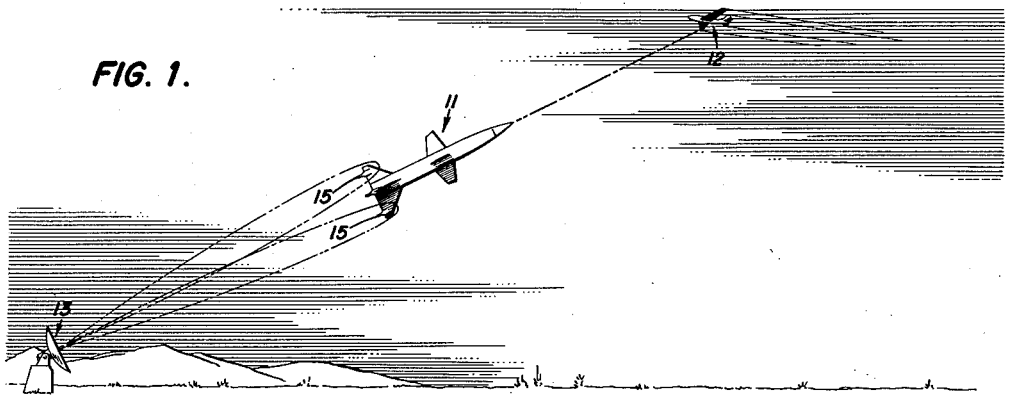
FIG. 1 is a pictorial representation of an aerial vehicle within a beam of radio waves emanating from a ground based radar transmitter.

In FIG. 1, an anti-aircraft missile 11 is shown being guided toward a point of collision with a target 12 by a ground based radar transmitter 13. The radar transmitter 13 directs a beam of radio waves at the target 12 while a receiver carried by the missile 11 derives steering signals from the beam by means including a lens-type antenna 15, suitably mounted on the missile. The missile is shown well advanced along its course toward the target and at a point where the power level of the beam has diminished so as to be no longer damaging to the receiver crystal. Previous to the position shown, however, the missile was within the beam at a point therealong where sufficient power to damage the crystal existed. During that portion of the missile's flight, protection is afforded the crystal by the attenuator which consists of a layer of shielding metal applied as an external coating upon the lens antenna.

Figure 2:
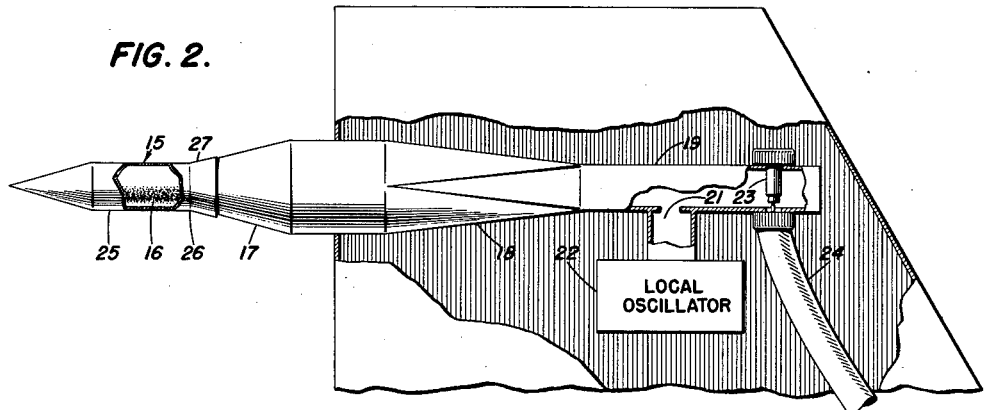
FIG. 2 is an enlarged elevation of a portion of the aerial vehicle shown in FIG. 1, illustrating a receiving antenna mounted thereon and with the attenuator shown in section.

In FIG. 2, details of the protective shielding are shown. A metallically coated dielectric lens antenna, made according to the present invention, is shown generally at 15. The antenna 15 is constituted by a dielectric lens 16 which is shaped to provide advantageous antenna gain characteristics and inserted into a section 17 of circular waveguide. A transition section 18 of waveguide efficiently couples the circular waveguide 17 to a section 19 of rectangular waveguide. A coupling slot 21 for admitting the output of a local oscillator 22 to the rectangular waveguide 19 and a crystal 23, which must be protected from exposure to radio waves of excessive power, are inserted in the section 19 to convert the high frequency of the received signal to a lower, intermediate frequency. A coaxial cable 24 conveys the intermediate frequency signal to the receiver amplifiers (not shown) where the signal is amplified and detected to provide steering signals for the missile.

The crystal protective attenuator comprises a film-like cap 25 of fusible metal deposited over the entire surface of the lens 16. As is shown by the reference numeral 27, care is taken to insure that the metallic cap 25 extends beyond the edge 26 of the waveguide section 17, to establish a good electrical bond between said cap and the waveguide. A metallic film so applied effectively attenuates incident radiation and thus protects the crystal 23, located within the missile, from being exposed to excessive signal amplitudes.

The film 25 may be any electrically conductive material having a satisfactorily low melting point. Wood's metal, an alloy of 50% bismuth, 25% lead, 12.5% tin, and 12.5% cadmium, and which has a melting point of 158° F., has been successfully used. The metal is melted and sprayed in the molten state upon the antenna so as to cover the lens and a portion of the waveguide which holds the lens. Upon cooling, the metal solidifies to form a conductive film-like cap 25 adequate to attenuate radio waves impinging upon the lens 16.

In use, a missile equipped with a lens antenna, coated in the manner described, is fired from a launcher close by the radar transmitter which will later supply it with steering information. Sufficient initial thrust is delivered to the missile by a booster rocket to accelerate said missile to a supersonic speed. When the booster rocket's fuel is exhausted so that said booster no longer delivers thrust, it is detached and falls away from the missile, said missile then proceeding under its own power in response to signals from the radar transmitter.

During the boost phase of missile flight, it is undesirable to attempt control. Moreover, the power of the radar signals is very high, and it is therefore desirable that the attenuator remain in place during the early portion of the boost phase. As the missile accelerates under the thrust delivered by the booster, the temperature at its surface rises beyond the melting point of the metallic film, permitting the metal to be blown away to expose the antenna 15. At the time the lens cap attenuator melts, the distance between the missile and radar transmitter has increased to a point where there is no longer any danger of harming the crystal.

It should be understood that the specification of a particular alloy as suitable for application according to the present invention is not intended to be a restriction to the use of that material. The choice of material will depend generally upon missile surface temperatures to be expected, at which destruction of the shielding material will be accomplished.

Figure 3:
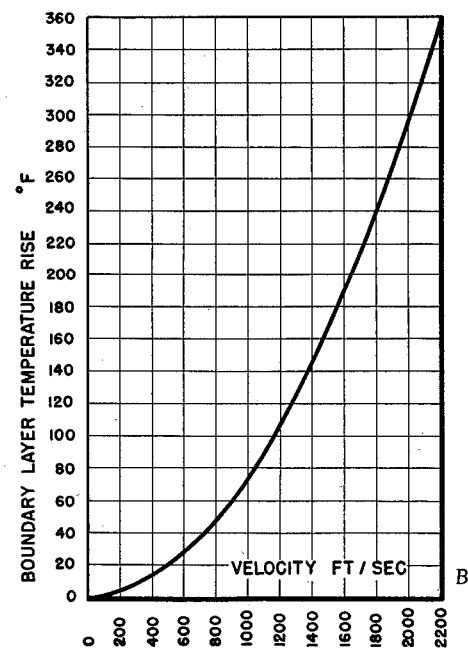
FIG. 3 is a chart showing surface temperatures to which the attenuator would be subjected at various velocities of a surrounding airstream.

That chart shown in FIG. 3 indicates the temperature rise which will occur at the surface of a missile traveling at various velocities. The temperature rise is the difference between the surface temperature of the missile and the ambient temperature of the atmosphere, resulting from the conversion of the kinetic energy of the freestream into heat. Conditions of laminar flow only are considered, since the temperature rise for turbulent flow conditions cannot easily be predicted, except to state that a turbulent condition will result in substantially higher surface temperatures.

Inasmuch as the present invention contemplates the provision of a protective device for supersonic missiles, it can be seen that a variety of materials are available for practicing the invention. A partial listing of alloys and their melting points is given in "Handbook of Chemistry and Physics," 33rd ed., Chemical Rubber Publishing Co., page 1346 ff.

Obviously many modifications and variations of the present invention are possible in the light of the above teachings. It is therefore to be understood that within the scope of the appended claims the invention may be practiced otherwise than as specifically described.

What is claimed is:

1. In a system for transmitting radiant energy from a point of transmission to a point of reception, shielding apparatus for attenuating the power of said radiant energy, comprising a metallic member interposed between said point of transmission and said point of reception, said metallic member being removable by the application of heat thereto, and means supporting said member at said point of reception.

2. A protective device for attenuating the power of electromagnetic waves, comprising an element for receiving said waves, and a metallic shield for said element, said metallic shield being removable by the application of heat thereto.

3. A protective device for attenuating the power of electromagnetic waves received by an aerial vehicle, comprising an antenna on the vehicle, and a metallic shield for the antenna and adapted for removal for exposing said antenna when attenuation is no longer required, said removal being accomplished by heat generated by friction incident to the passage of said vehicle through the atmosphere.

4. In a microwave radio system including receiving means mounted on an aerial missile, an attenuator for said receiving means, comprising a film of fusible metal on the receiving means for electrically shielding the same, said metallic film becoming molten and disintegrating as an effect of heat generated by friction incident to the passage of said missile through the atmosphere.

5. In a radio receiving apparatus, an antenna, and an attenuator on the antenna, said attenuator comprising a film of fusible metal, said antenna with said attenuator mounted thereon being movable through a fluid medium for removing said attenuator by heat due to friction.

6. In an aerial missile having receiving means including an antenna mounted thereon for receiving signals from a source of radiant energy, said missile being located initially proximate said source and subject to damage therefrom and adapted to proceed along a course from said initial location toward a distant point, initially undergoing acceleration along said course from a low velocity to a higher velocity; a protective device for said receiving means, comprising a metallic film deposited over the surface of said antenna, said metallic film being adapted to become fluent at a temperature corresponding to the missile skin temperature prevailing at a velocity intermediate of said low velocity and said higher velocity for exposing the antenna.

References Cited in the file of this patent

UNITED STATES PATENTS

| | | |
|---|---|---|
| 2,206,923 | Southworth | July 9, 1940 |
| 2,369,808 | Southworth | Feb. 20, 1945 |